(12) United States Patent
Raymond et al.

(10) Patent No.: US 7,167,351 B2
(45) Date of Patent: Jan. 23, 2007

(54) FAULTED CURRENT INDICATOR

(75) Inventors: Donald M. Raymond, Fort Collins, CO (US); Donald A. Raymond, Fort Collins, CO (US)

(73) Assignee: Raymond & Lae Engineering, Inc., Fort Collins, CO (US)

( * ) Notice: Subject to any disclaimer, the term of this patent is extended or adjusted under 35 U.S.C. 154(b) by 259 days.

(21) Appl. No.: 11/028,700

(22) Filed: Jan. 3, 2005

(65) Prior Publication Data

US 2006/0146468 A1    Jul. 6, 2006

(51) Int. Cl.
*H02H 3/00*    (2006.01)
(52) U.S. Cl. ..................... 361/93.1; 340/638
(58) Field of Classification Search ........... 361/93.1
See application file for complete search history.

(56) References Cited

U.S. PATENT DOCUMENTS

| | | | | |
|---|---|---|---|---|
| H000248 H | * | 4/1987 | Middlebrooks | 340/639 |
| 4,931,778 A | * | 6/1990 | Guajardo | 340/664 |
| 5,438,225 A | * | 8/1995 | Berger | 307/66 |
| 5,493,278 A | * | 2/1996 | Mackenzie et al. | 340/638 |
| 5,546,266 A | * | 8/1996 | Mackenzie et al. | 361/93.4 |
| 6,774,803 B1 | * | 8/2004 | Tiffin | 340/638 |
| 6,927,695 B1 | * | 8/2005 | Hayden | 340/657 |

* cited by examiner

*Primary Examiner*—Ronald Leja
(74) *Attorney, Agent, or Firm*—Cochran Freund & Young LLC; Samuel M. Freund

(57) ABSTRACT

Faulted current indicator. Apparatus and method for observing the status of faulted current interrupters for high voltage transmission lines are described. Light emitting diodes powered by a photovoltaic voltage source are used to identify interrupters which have been tripped.

20 Claims, 2 Drawing Sheets

FAULTED CURRENT INDICATOR

FIELD OF THE INVENTION

The present invention relates generally to current fault interrupters for high voltage electrical distribution systems and, more particularly, to faulted current indicators for monitoring the status of current fault interrupters.

BACKGROUND OF THE INVENTION

Electrical utility companies generally provide current fault interrupters on each phase of each power line which, as an example, respond to the grounding of a current-carrying line. For underground power lines, such fault interrupters are located in underground vaults. In order to isolate power line difficulties, the status of potentially involved interrupters must be determined. Fault interrupter status indicators, commonly called faulted current indicators, are used for this purpose; typically, trip flags are used. Other devices supplied by utility companies provide a grounded response which can be observed in the event of power loss by the line being monitored. In order to monitor the faulted current indicators, however, an individual must enter the vault where these devices are located. Generally, interrupter vaults offer poor ambient conditions, with chemical, electrical and fire hazards being the possible cause or result of a fault. Therefore, self-contained breathing apparatus must be available, or the air in the vaults must be replaced using vacuum pumps and pipes. Additionally, the resulting environment must be tested before repair crews are allowed to enter a particular vault with their attendant time delays and cost, rendering the process of identifying the cause of a current fault unacceptable to utility companies.

Trip flag interrupt indicators may be viewed without entering the interrupter vault by mounting the indicators on the cylindrical wall of a manhole providing access to the current fault interrupter vault, as an example. Commercially available indicators are about 2 in. in diameter and about 2½ in. thick. Moreover, the electrical lines being monitored must also be present in the manhole. This amount of clutter makes it difficult for a service person to enter the manhole.

Monitoring the status of current interrupters for high voltage electrical distribution systems may also be achieved by other commercially available devices. Typically, these are powered by internal batteries or wired to an external electric source, both of which require maintenance and, in the case of batteries, replacement of the power source. Moreover, external, hard-wired power sources may be difficult and/or expensive to provide when independent power lines are unavailable, since power for the indicators derived from the wires being monitored becomes unavailable once a fault occurs.

Accordingly, it is an object of the present invention to provide an apparatus for remotely detecting a current interruption in electric utility wires.

Another object of the present invention is to provide an apparatus for detecting current interruption in underground electric utilities such that service personnel can observe the condition of current fault interrupters without entering vaults containing faulted current indicators.

Yet another object of the invention is to provide an apparatus for detecting current interruption without the requirement for battery powered faulted current indicators or indicators powered using the wires to be monitored or wires having the potential for a conductive pathway to ground.

Additional objects, advantages and novel features of the invention will be set forth, in part, in the description that follows, and, in part, will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus for determining the status of a current fault interrupter for a high-voltage electrical distribution system having an output device responsive to the status of the fault interrupter which is electrically grounded in the event of a fault, hereof, includes: a first indicator lamp having a first electrode and a second electrode; and a photovoltaic power source effective for illuminating the first indicator lamp and in electrical communication with the first electrode of the first indicator lamp, the second electrode thereof being in electrical communication with the output device of the current fault interrupter such that in the event of a fault, the first indicator lamp illuminates when said photovoltaic power source is exposed to light from a light source.

In another aspect of the invention and in accordance with its objects and purposes, the apparatus hereof for determining the status of a current fault interrupter for a high-voltage electrical distribution system having an output device responsive to the status of the fault interrupter, the output device being electrically grounded in the event of a fault, the apparatus including: means for sensing a ground condition of the fault interrupter output device and disposed remotely thereto; means for reading the ground condition sensing means; and means for providing electric power to the reading means without using a conductive ground path to the means for providing electric power.

In yet another aspect of the invention and in accordance with its objects and purposes, the method for determining the status of a current fault interrupter for a high-voltage electrical distribution system having an output device responsive to the status of the fault interrupter which is electrically grounded in the event of a fault, hereof includes the step of energizing a photovoltaic power source effective for illuminating an indicator lamp in electrical communication with the output device such that in the event of a fault, the indicator lamp illuminates.

Benefits and advantages of the present invention include, but are not limited to, long lifetime, remote monitoring of current status away from high voltage dangers without the requirement of regular maintenance and without a conductive ground path to the source of energy.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1A is a schematic representation of a light emitting diode embodiment of the apparatus of the present invention, while

DETAILED DESCRIPTION

Figure 1A:
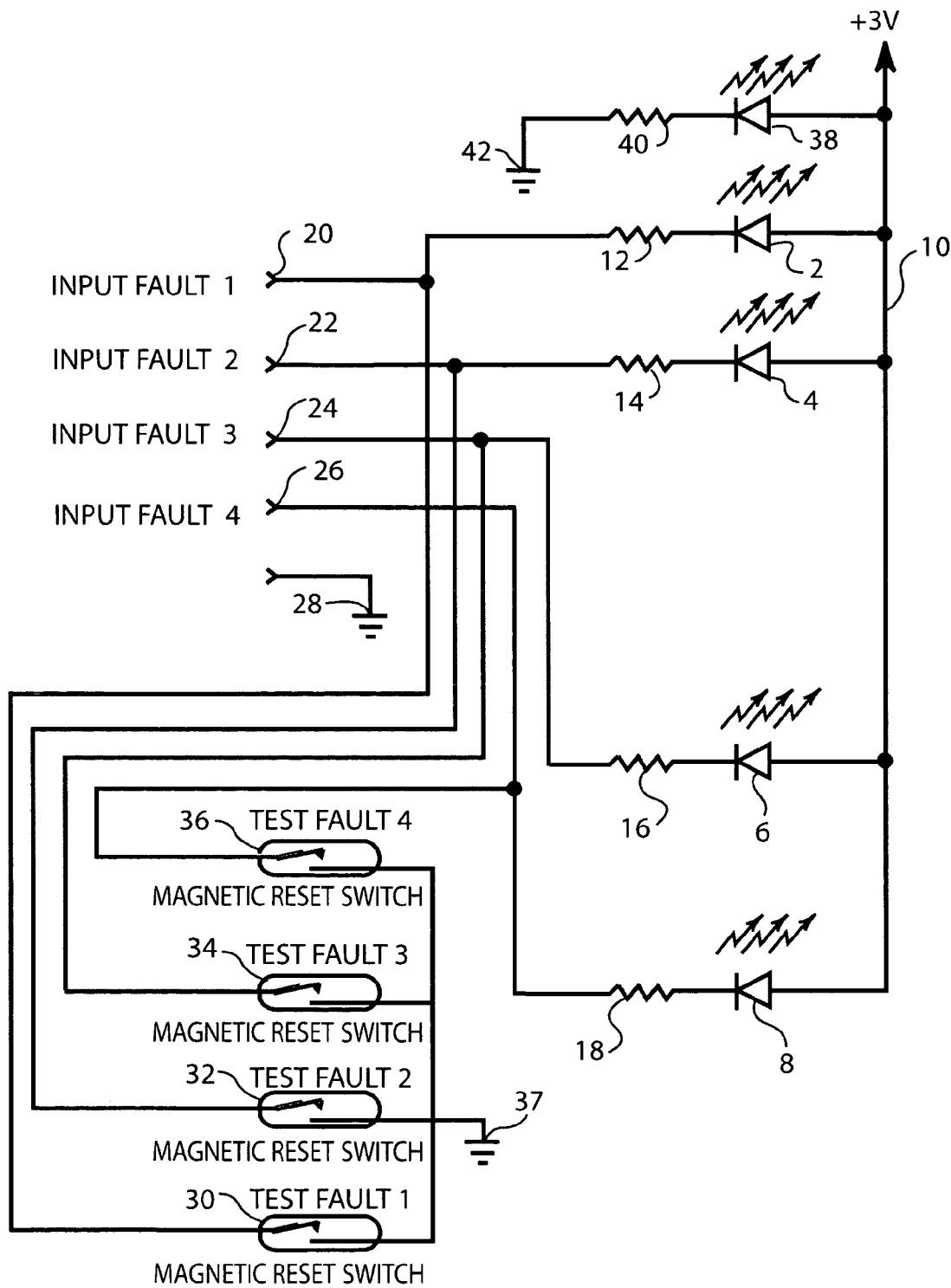

Briefly, the present invention includes an apparatus and method for remotely monitoring the condition of current fault interrupters responsive to ground faults, as an example, for high-voltage electric utility lines. Current fault interrupters are often supplied with an output device which becomes grounded when the interrupter is tripped. The present invention makes use of this grounded condition, since the faulted current indicator hereof is responsive to a grounded condition.

In one embodiment of the invention, the apparatus includes a low-voltage, photovoltaic cell powered series of light emitting diodes (LEDs), red LEDs as an example, which illuminate when both conditions of sufficient light being directed at the photovoltaic cell, and at least one of the current fault interrupts is tripped are satisfied, thereby identifying which interrupt needs attention. An enclosure having a clear face would permit viewing the LEDs while protection of the photovoltaic device and the LEDs from adverse conditions.

An advantage of the photovoltaic power source is that the LEDs can be powered when utility service personnel are investigating a fault. The LEDs and power electrical circuitry can be located within a manhole leading to a set of fault interrupt devices or located in an above-ground box in the vicinity of a fault interrupt device vault. In actual operation a service person would illuminate the photovoltaic device using, for example, a flashlight or other light carried by the service person, and observe whether any of the LEDs are illuminated. If so, the service person would check an identification tag or number associated with the illuminated LED to determine which of the fault interrupts had tripped. Typically, one current fault interrupter would be located on each of the phases for each high voltage line.

In another embodiment of the invention, a different colored light, say, a green LED, would illuminate when the photovoltaic device was illuminated by a flashlight, thereby indicating that power was being supplied to all of the fault detection LEDs. In this situation, the red LEDs would illuminate when a current fault occurred.

Generally, 3–5, 3-phase interrupt detectors would be placed on the sidewall of a manhole and near to the cover in order to avoid having the diameter of the manhole become too restricted; the holder for these devices could be made circular in order to further improve access into the manhole. Another consideration is the power that can be generated by the photovoltaic device.

Present LED devices are sufficiently bright to permit viewing of the indicator lights during daylight hours. In this situation, the photovoltaic device might be powered by the sun. Thus, once the manhole cover were opened, if the green indicator light illuminated, further illumination using a flashlight would be unnecessary.

In another embodiment of the invention the photovoltaic/solar cell and the detection electronics could be placed on a flexible PC board.

Reference will now be made in detail to the present preferred embodiments of the invention examples of which are illustrated in the accompanying drawings. In what follows, identical callouts will be used to identify similar or identical structure. Turning now to FIG. 1A, a circuit diagram is schematically shown for LED monitoring of the condition of four fault interrupters. Shown are four LED lamps, 2, 4, 6, and 8, wired in parallel to 3V power bus, 10, each LED having a series resistor, 12, 14, 16, and 18, respectively, and a series connection with fault interrupt indicator devices through connectors, 20, 22, 24, and 26, respectively which provide a path to ground, 28, when a current fault interrupt occurs. Test switches, 30, 32, 34, and 36, are also in parallel connection with connectors 20, 22, 24, and 26, respectively, to the corresponding interrupt indicator devices, and may be used to test each LED by providing a path, 37, to ground. LED, 38, in series connection with resistor, 40, which is in turn connected to ground, 42, permits a user of the present apparatus to determine whether there is power to bus 10. Clearly, more than one LED can be used with each ground fault indicator, and many colors can be chosen to indicate power to bus 10, and a faulted current interrupt. Resistors 12, 14, 16, 18, and 40, were chosen to be 511 Ω in accordance with the manufacturer's recommendations for the LEDs employed. Clearly, other indicator lights can be employed, so long as they are compatible with the voltage and current characteristics of the photovoltaic device/solar cell voltage source.

Figure 1B:
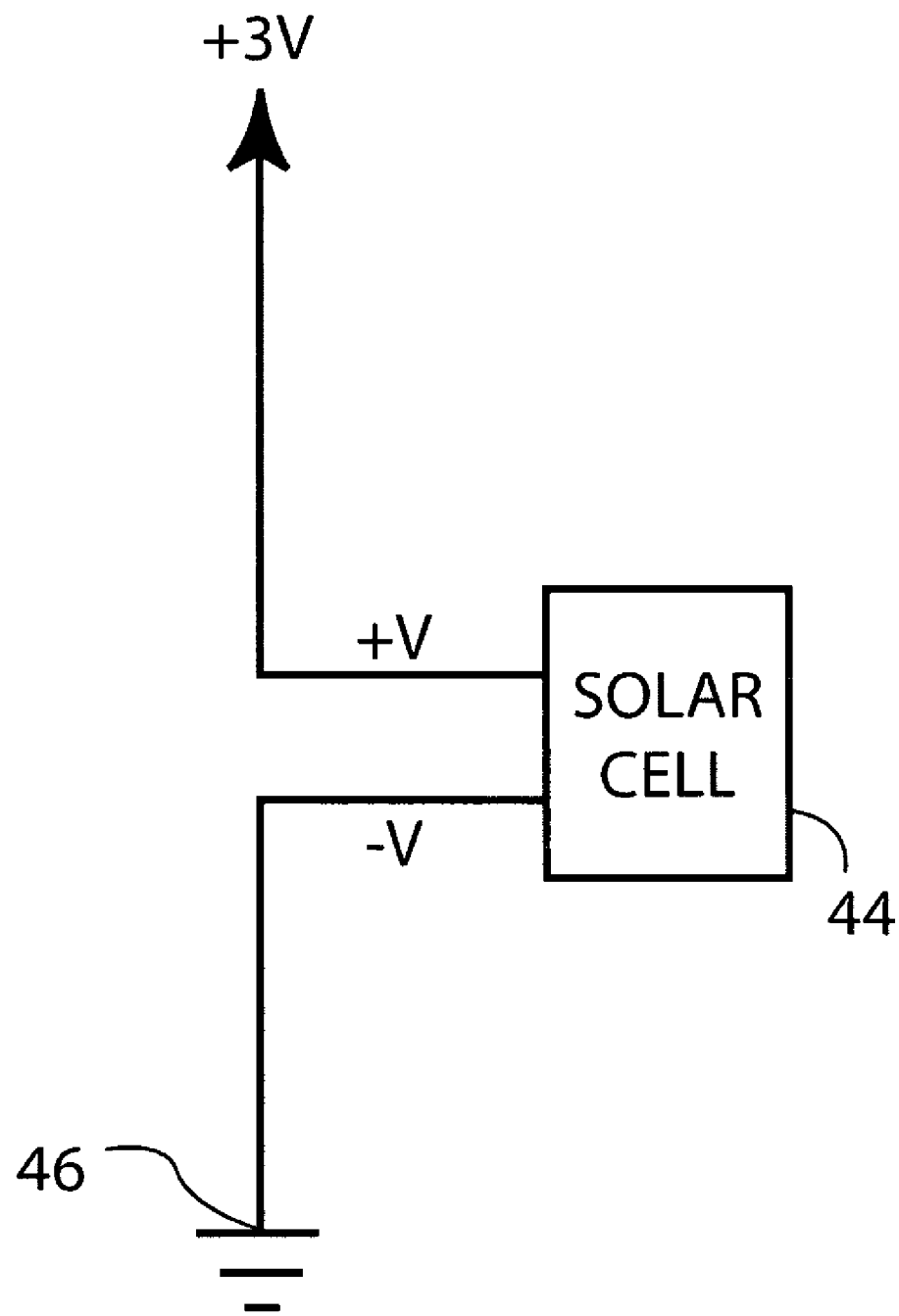
FIG. 1B is a schematic representation of a photovoltaic power source for the apparatus shown in FIG. 1A hereof.

FIG. 1B is a schematic representation of solar cell, 44, the output of which is attached to bus 10, while the terminal thereof is grounded, 46.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for determining the status of a current fault interrupter for a high-voltage electrical distribution system having an output device responsive to the status of the fault interrupter which is electrically grounded in the event of a fault, said apparatus comprising in combination:
   (a) a first indicator lamp having a first electrode and a second electrode; and
   (b) a photovoltaic power source effective for illuminating said first indicator lamp and in electrical communication with the first electrode of said first indicator lamp, the second electrode thereof being in electrical communication with the output device of the current fault interrupter such that in the event of a fault, said first indicator lamp will illuminate when said photovoltaic power source is exposed to light from a light source.

2. The apparatus as described in claim 1, wherein said first indicator lamp is disposed in a location remote from the current fault interrupter.

3. The apparatus as described in claim 1, wherein said first indicator lamp comprises a light emitting diode.

4. The apparatus as described in claim 1, wherein the light source comprises a flashlight.

5. The apparatus as described in claim 1, wherein the light source comprises sunlight.

6. The apparatus as described in claim 1, further comprising a second indicator lamp having two electrodes and in electrical connection with said photovoltaic light source such that said second indicator lamp illuminates when said photovoltaic power source is exposed to light from a light source.

7. The apparatus as described in claim 6, wherein said second indicator lamp comprises a light emitting diode.

8. The apparatus as described in claim 6, wherein said second indicator lamp has a different color than said first indicator lamp.

9. The apparatus as described in claim 6, wherein said second indicator lamp is disposed in the vicinity of said first indicator lamp.

10. The apparatus as described in claim 1, further comprising a test switch for activating said first indicator lamp.

11. Apparatus for determining the status of a current fault interrupter for a high-voltage electrical distribution system having an output device responsive to the status of the fault interrupter such that the output device is electrically grounded in the event of a fault, said apparatus comprising in combination:
   (a) means for sensing a grounded condition of the fault interrupter output device and disposed remotely thereto;
   (b) means for reading said ground condition sensing means; and
   (c) means for providing electric power to said reading means without using batteries or power from the electrical distribution system.

12. The apparatus as described in claim 11, wherein said sensing means comprises a first indicator lamp placed in electrical connection with the fault interrupter output device.

13. The apparatus as described in claim 12, wherein said first indicator lamp comprises a light emitting diode.

14. The apparatus as described in claim 13, wherein said means for providing electrical power to said means for reading said ground condition comprises a photovoltaic cell for providing electrical energy to said light emitting diode such that when light effective to power said photovoltaic cell is supplied, said light emitting diode will illuminate in the situation where the fault interrupter output device is electrically grounded.

15. The apparatus as described in claim 14, wherein the light source comprises a flashlight.

16. The apparatus as described in claim 14, wherein the light source comprises sunlight.

17. A method for determining the status of a current fault interrupter for a high-voltage electrical distribution system having an output device responsive to the status of the fault interrupter which is electrically grounded in the event of a fault, said method comprising the step of energizing a photovoltaic power source effective for illuminating an indicator lamp in electrical communication with the output device such that in the event of a fault, the indicator lamp illuminates.

18. The method as described in claim 17, wherein the indicator lamp comprises a light emitting diode.

19. The method as described in claim 17, wherein said the step of energizing the photovoltaic power source comprises illuminating the photovoltaic power source using a flashlight.

20. The method as described in claim 17, wherein said the step of energizing the photovoltaic power source comprises illuminating the photovoltaic power source using sunlight.

* * * * *